United States Patent Office 3,574,842
Patented Apr. 13, 1971

3,574,842
COMPOSITIONS OF 4-(1,2,4-OXADIAZOLE-3 OR 5-YL)PYRIDINIUM SALTS AND METHOD OF LOWERING BLOOD SUGAR LEVELS WITH SAME
Victor John Bauer, Montvale, N.J., William Joseph Fanshawe, Pearl River, N.Y., and Sidney Robert Safir, River Edge, N.J., assignors to American Cyanamid Company, Stamford, Conn.
No Drawing. Continuation-in-part of application Ser. No. 676,706, Oct. 20, 1967. This application Nov. 10, 1969, Ser. No. 875,529
Int. Cl. A61k 27/00
U.S. Cl. 424—263          10 Claims

ABSTRACT OF THE DISCLOSURE

Compositions containing quaternary 1,2,4-oxadiazolyl-pyridinium salts are described along with methods of using the same. These active components show hypoglycemic activity evidenced by their ability to lower blood sugar levels.

---

This application is a continuation-in-part of our application Ser. No. 676,706, filled Oct. 20, 1967, now abandoned.

SUMMARY OF THE INVENTION

This invention relates to new compositions of matter containing quaternary 1,2,4 - oxadiazolylpyridinium salts as active components of said compositions and methods of use. The active components may be illustrated by the following formula:

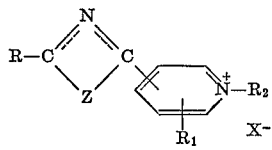

wherein R is selected from the group consisting of hydrogen, lower alkyl, cyclopropyl, cyclobutyl, and phenyl; $R_1$ is selected from the group consisting of hydrogen and lower alkyl; $R_2$ is selected from the group consisting of lower alkyl, lower alkenyl, and lower alkoxy(lower) alkyl; Z is a trivalent radical selected from the group consisting of

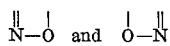

and X is a pharmaceutically acceptable anion such as, for example, chloride, bromide, iodide, and the like. The dotted line represents one double bond, the position of which is dependent upon the definition of Z. When Z is

the double bond is between the N and carbon containing R, and when Z has the other meaning, the double bond is in the other position. The term loweralkyl is intended to include those having 1 to 4 carbon atoms. The term halogen includes chlorine, bromine, fluorine and iodine. Also, loweralkenyl includes those having 1 to 4 carbon atoms.

In general, the active components are crystalline solids, soluble in water.

The active components of the present invention may be prepared by reaction of a 1,2,4-oxadiazolylpyridine with a lower alkyl, lower alkenyl, or lower alkoxy (lower)alkyl halide at a temperature of 0° to 200° C. with or without a solvent, such as a lower alkyl alcohol, for a time of one minute to twenty-four hours in an open vessel or a sealed bomb.

The reaction is illustrated schematically below:

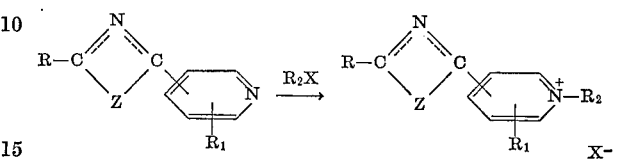

wherein R, $R_1$, $R_2$, Z and X are as hereinbefore defined.

Among the active components of the present invention are, for example:

1-methyl-4-(5-methyl-1,2,4-oxadiazol-3-yl)-pyridinium chloride,
1-methyl-4-(3-methyl-1,2,4-oxadiazol-5-yl)-pyridinium chloride,
1-ethyl-4-(1,2,4-oxadiazol-3-yl)pyridinium bromide,
1-propyl-4-(3-butyl-1,2,4-oxadiazol-5-yl)pyridinium iodide,
1-allyl-4-(5-cyclopropyl-1,2,4-oxadiazol-3-yl) pyridinium bromide,
1-(2-ethoxyethyl)-4-(3-cyclobutyl-1,2,4-oxadiazol-5-yl)-pyridinium nitrate,
1-methyl-4-(5-ethyl-1,2,4-oxadiazol-3-yl)-pyridinium chloride,
1-methyl-4-(3-propyl-1,2,4-oxadiazol-5-yl)-pyridinium bromide,
1-(2-butenyl)-4-(3-butenyl-1,2,4-oxadiazol-5-yl) pyridinium chloride,
1,3-dimethyl-4-(5-methyl-1,2,4-oxadiazol-3-yl)-pyridinium chloride,
1-(2-methoxyethyl)-4-(1,2,4-oxadiazol-3-yl)pyridinium bromide,
1-methyl-4-(3-phenyl-1,2,4-oxadiazol-5-yl)pyridinium iodide, and
1-methyl-4-(5-isopropyl-1,2,4-oxadiazol-3-yl)pyridinium chloride.

The active components of the present invention show hypoglycemic activity which indicates them to be useful as medicaments in the lowering of blood sugar levels. When the active components are administered orally to normal mice, a reduction of blood sugar levels is observed. The active components of this invention are administered by gavage as saline solutions or aqueous carboxymethylcellulose suspensions to CF–1 mice (Carworth Farms, 18–25 grams, 4–6 animals). Control animals receive an equivalent volume of vehicle. Food is withheld from animals after dosing. Blood glucose is determined on 0.05 ml. samples of blood by the method of Hoffman [J. Biol. Chem., 120, 51 (1937)] as adapted to the Technicon AutoAnalyzer® and is expressed as percent change from predose values. The data are shown in the table hereinafter. These results show that the active components of the present invention are uesful in lowering the blood glucose concentrations of warm-blooded animals.

The active components of this invention may be used for the lowering of blood sugar levels in warm-blooded animals at a dose of from about 0.1 mg. to about 100 mg. per kilogram of body weight.

with water. The crystals which form are collected, washed with water, and recrystallized from petroleum ether to provide colorless crystals, melting point 42–44° C.

TABLE
[Decrease in blood glucose in normal mice after oral administration of 1,2,4-oxadiazolylpyridinium salts]

| Compound | Dose, mmoles/kg. | Hours after dosing | Percent decrease in blood glucose |
| --- | --- | --- | --- |
| 1-methyl-4-(1,2,4-oxadiazol-3-yl)pyridinium chloride | 1.6 | 6 | 35±5 |
| 1-methyl-4-(5-methyl-1,2,4-oxadiazol-3-yl)pyridinium chloride | 3.2 | 6 | 71±8 |
| 1-ethyl-4-(5-methyl-1,2,4-oxadiazol-3-yl)pyridinium iodide | 3.0 | 5 | 48±5 |
| 1-allyl-4-(5-methyl-1,2,4-oxadiazol-3-yl)pyridinium chloride | 3.0 | 3 | 41±11 |
| 1-methallyl-4-(5-methyl-1,2,4-oxadiazol-3-yl)pyridinium chloride | 0.5 | 5 | 12±3 |
| 1-(2-ethoxyethyl)-4-(5-methyl-1,2,4-oxadiazol-3-yl)pyridinium chloride | 3.0 | 3 | 27±4 |
| 1-methyl-4-(5-ethyl-1,2,4-oxadiazol-3-yl)pyridinium perchlorate | 3.0 | 5 | 93±1 |
| 1-methyl-4-(5-cyclopropyl-1,2,4-oxadiazol-3-yl)pyridinium chloride | 3.0 | 3 | 87±3 |
| 1-methyl-4-(5-cyclobutyl-1,2,4-oxadiazol-3-yl)pyridinium chloride | 3.0 | 3 | 60±11 |
| 1,3-dimethyl-4-(5-methyl-1,2,4-oxadiazol-3-yl)pyridinium iodide | 3.0 | 3 | 82±3 |
| 1-methyl-4-(5-phenyl-1,2,4-oxadiazol-3-yl)pyridinium chloride | 1.5 | 5 | 56±13 |
| 1-methyl-4-(3-methyl-1,2,4-oxadiazol-5-yl)pyridinium chloride | 3.0 | 5 | 44±5 |
| 1-methyl-4-(3-cyclopropyl-1,2,4-oxadiazol-5-yl)pyridinium chloride | 3.0 | 3 | 29±4 |
| 1-methyl-3-(5-methyl-1,2,4-oxadiazol-3-yl)pyridinium iodide | 3.0 | 5 | 38±6 |
| 1-methyl-2-(5-methyl-1,2,4-oxadiazol-3-yl)pyridinium iodide | 3.0 | 3 | 50±12 |

The active components of the present invention as hypoglycemic agents can be incorporated in various pharmaceutical forms such as tablets, capsules, pills and so forth, for immediate or sustained release, by combining the suitable carriers. They may be in the form of dosage units for a single therapeutic dose or in small units for multiple dosages or in larger units for division into single doses. The dosage in warm-blooded animals usually varies from 1 mg. to 100 mg. per kilogram per day. Obviously, in addition to the therapeutic hypoglycemic compounds there may be present excipients, binders, fillers and other therapeutically inert ingredients necessary in the formulation of the desired pharmaceutical preparation.

DETAILED DESCRIPTION

The following examples describe in detail the preparation of representative quaternary 1,2,4-oxadiazolylpyridinium salts active components of this invention and formulations for use of the active components.

EXAMPLE 1

Preparation of 4-(1,2,4-oxadiazol-3-yl)pyridine

A mixture of 1.4 g. of isonicotinamidoxime, 10 ml. of triethyl orthoformate, and 1 drop of concentrated sulfuric acid is heated under reflux for 2½ hours. The solution is diluted with water, acidified with sulfuric acid, and washed with ether. The aqueous solution is made basic with sodium hydroxide. The solid which separates is collected, washed with water, and recrystallized from water to provide colorless crystals, melting point 147–148° C.

EXAMPLE 2

Preparation of 4-(5-methyl-1,2,4-oxadiazol-3-yl)pyridine

A mixture of 27 g. of isonicotinamidoxime and 50 ml. of acetic anhydride is warmed on a steam bath for 2 hours, and then heated under reflux for 3 hours. The solvent is distilled, and the dark liquid residue is diluted with water. The crystals which form are collected, washed with water, and recrystallized from ethanol to provide colorless crystals, melting point 92–93° C.

EXAMPLE 3

Preparation of 4-(5-ethyl-1,2,4-oxadiazol-3-yl)pyridine

A mixture of 27 g. of isonicotinamidoxime and 60 ml. of propionic anhydride is warmed on a steam bath for 2 hours and then heated at 145° C. for 4 hours. The solvent is distilled and the dark liquid residue is diluted

EXAMPLE 4

Preparation of 4-(5-cyclopropyl-1,2,4-oxadiazol-3-yl)pyridine

A mixture of 5.4 g. of isonicotinamidoxime and 19 g. of cyclopropanecarboxylic acid anhydride is heated at 170° C. for 2 hours. The mixture is diluted with chloroform and washed with water and aqueous sodium carbonate. The chloroform solution is dried over anhydrous magnesium sulfate and concentrated to a solid. This solid is recrystallized from methanol-water to give tan crystals, melting point 78–82° C.

EXAMPLE 5

Preparation of 4-(5-cyclobutyl-1,2,4-oxadiazol-3-yl)pyridine

A mixture of 11 g. of isonicotinamidoxime and 20 ml. of cyclobutanecarboxylic acid anhydride is heated at 200° C. for 3 hours. The reaction mixture is diluted with ether and washed with water and aqueous sodium carbonate. The ethereal solution is dried over anhydrous magnesium sulfate and the solvent distilled to give a brown liquid. This liquid is distilled at 0.07 mm. to provide the product as a colorless, mobile liquid, boiling point 105–108° C.

EXAMPLE 6

Preparation of 3-methyl-4-(5-methyl-1,2,4-oxadiazol-3-yl)pyridine

A mixture of 1.0 g. of 3-methyl-isonicotinamidoxime and 35 ml. of acetic anhydride is heated under reflux for 3 hours. The solution is concentrated under reduced pressure to yield a brown liquid.

EXAMPLE 7

Preparation of 4-(5-phenyl-1,2,4-oxadiazol-3-yl)pyridine

A mixture of 13.7 g. of isonicotinamidoxime and 45.2 g. of benzoic anhydride is heated at 170° C. for 3 hours. The solid residue is washed with aqueous sodium carbonate solution and then is recrystallized from ethanol to provide cream-colored crystals, melting point 146–148° C.

EXAMPLE 8

Preparation of 4-(3-methyl-1,2,4-oxadiazol-5-yl)pyridine

A stirred mixture of 4.6 g. of isonicotinic acid anhydride and 1.5 g. of acetamidoxime in 100 ml. of xylene is heated under reflux for 4 hours. The mixture is filtered and the filtrate is evaporated to give a crystalline residue. These crystals are recrystallized from hexane to give white crystals, melting point 88–89° C.

EXAMPLE 9

Preparation of 4-(3-cyclopropyl-1,2,4-oxadiazol-5-yl)pyridine

A mixture of 4.6 g. of isonicotinic acid anhydride and 2.0 g. of cyclopropanecarboxamidoxime is heated at 170° C. for 90 minutes. The reaction mixture is washed with aqueous sodium carbonate solution. The undissolved solid is collected and recrystallized from hexane to give cream-colored crystals, melting point 92–93° C.

EXAMPLE 10

Preparation of 3-(5-methyl-1,2,4-oxadiazol-3-yl)pyridine

A mixture of 13.7 g. of nicotinamidoxime and 50 ml. of acetic anhydride is heated under reflux for 3 hours. The solution is concentrated under reduced pressure to a brown solid. The solid is washed with water to provide tan crystals, melting point 107–111° C.

EXAMPLE 11

Preparation of 2-(5-methyl-1,2,4-oxadiazol-3-yl)pyridine

A mixture of 13.7 g. of picolinamidoxime and 50 ml. of acetic anhydride is heated under reflux for 2 hours, diluted with water, and concentrated under reduced pressure to a black liquid. This liquid is dissolved in chloroform, and the chloroform is washed with aqueous sodium carbonate solution, dried over magnesium sulfate, and concentrated under reduced pressure to a brown solid. Recrystallization from isopropyl alcohol provides pale orange crystals, melting point 89–90° C.

EXAMPLE 12

Preparation of 1-methyl-4-(1,2,4-oxadiazol-3-yl)pyridinium chloride

A mixture of 2.0 g. of 4-(1,2,4-oxadiazol-3-yl)pyridine and 10 ml. of methyl chloride is heated at 130° C. in a bomb for 18 hours. The excess methyl chloride is allowed to evaporate, and the colorless residue is recrystallized from isopropyl alcohol to provide colorless crystals, melting point 206° C., dec.

EXAMPLE 13

Preparation of 1-methyl-4-(5-methyl-1,2,4-oxadiazol-3-yl)pyridinium chloride

A mixture of 4.5 g. of 4-(5-methyl-1,2,4-oxadiazol-3-yl)pyridine and 10 ml. of methyl chloride is heated at 120° C. in a bomb for 18 hours. The excess methyl chloride is allowed to evaporate, and the solid residue is recrystallized from isopropyl alcohol-ether to provide colorless crystals, melting point 142–143° C.

EXAMPLE 14

Preparation of 1-ethyl-4-(5-methyl-1,2,4-oxadiazol-3-yl)pyridinium iodide

A mixture of 3.2 g. of 4-(5-methyl-1,2,4-oxadiazol-3-yl)pyridine and 20 ml. of ethyl iodide is heated under reflux for 30 minutes. The excess ethyl iodide is distilled and the solid is recrystallized from isopropyl alcohol-hexane to give yellow crystals, melting point 140–142° C.

EXAMPLE 15

Preparation of 1-allyl-4-(5-methyl-1,2,4-oxadiazol-3-yl)pyridinium chloride

A mixture of 2 g. of 4-(5-methyl-1,2,4-oxadiazol-3-yl)pyridine and 10 ml. of allyl chloride is heated at 100° C. in a bomb for 20 hours. The excess allyl chloride is distilled and the solid residue is recrystallized from isopropyl alcohol-hexane to provide tan crystals, melting point 188–190° C.

EXAMPLE 16

Preparation of 1-methallyl-4-(5-methyl-1,2,4-oxadiazol-3-yl)pyridinium chloride

A mixture of 3.2 g. of 4-(5-methyl-1,2,4-oxadiazol-3-yl)pyridine and 10 ml. of methallyl chloride is heated in a bomb at 90° C. for 20 hours. The excess methally chloride is distilled and the solid residue is recrystallized from isopropyl alcohol-hexane to give an off-white solid, melting point 175–177° C.

EXAMPLE 17

Preparation of 1-(2-ethoxyethyl)-4-(5-methyl-1,2,4-oxadiazol-3-yl)pyridinium chloride A mixture of 5.0 g. of 4-(5-methyl-1,2,4-oxadiazol-3-yl)pyridine and 15 ml. of 2-chloroethyl ether is heated in a bomb at 130° C. for 20 hours. The excess 2-chloroethyl ether is evaporated and the black residue is recrystallized from isopropyl alcohol-ether to give off-white crystals, melting point 187–188° C.

EXAMPLE 18

Preparation of 1-methyl-4-(5-ethyl-1,2,4-oxadiazol-3-yl)pyridinium perchlorate

A mixture of 3.0 g. of 4-(5-ethyl-1,2,4-oxadiazol-3-yl)pyridine and 10 ml. of methyl chloride is heated in a bomb at 95° C. for 18 hours. The methyl chloride is allowed to evaporate. To the residue is added 3 g. of 70% perchloric acid and 80 ml. isopropyl alcohol. The solid which precipitates is recrystallized from ethanol to give tan crystals, melting point 128–129° C.

EXAMPLE 19

Preparation of 1-methyl-4-(5-cyclopropyl-1,2,4-oxadiazol-3-yl)pyridinium chloride A mixture of 3.0 g. of 4-(5-cyclopropyl-1,2,4-oxadiazol-3-yl)pyridine and 10 ml. of methyl chloride is heated in a bomb at 90° C. for 20 hours. The excess methyl chloride is allowed to evaporate and the residue is recrystallized from acetonitrile to give off-white crystals, melting point 212–214° C.

EXAMPLE 20

Preparation of 1-methyl-4-(5-cyclobutyl-1,2,4-oxadiazol-3-yl)pyridinium chloride A mixture of 3.0 g. of 4-(5-cyclobutyl-1,2,4-oxadiazol-3-yl)pyridine and 10 ml. of methyl chloride is heated in a bomb at 85° C. for 20 hours. The methyl chloride is allowed to evaporate and the solid residue is recrystallized from acetonitrile to give white needless, melting point 200–203° C.

EXAMPLE 21

Preparation of 1,3-dimethyl-4-(5-methyl-1,2,4-oxadiazol-3-yl)pyridinium iodide

A solution of 1.0 g. of 3-methyl-4-(5-methyl-1,2,4-oxadiazol-3-yl)pyridine and 10 ml. of methyl iodide in 20 ml. of methanol is heated under reflux for 4 hours. The solution is concentrated under reduced pressure to a solid, and this solid is recrystallized from isopropyl alcohol to provide yellow crystals, melting point 122–124° C.

EXAMPLE 22

Preparation of 1-methyl-4-(5-phenyl-1,2,4-oxadiazol-3-yl)pyridinium chloride

A mixture of 5.0 g. of 4-(5-phenyl-1,2,4-oxadiazol-3-yl)pyridine and 10 ml. of methyl chloride is heated at 90° C. in a bomb for 20 hours. The excess methyl chloride is allowed to evaporate, and the solid residue is recrystallized from acetonitrile to provide colorless crystals, melting point 260–262° C.

EXAMPLE 23

Preparation of 1-methyl-4-(3-methyl-1,2,4-oxadiazol-5-yl)pyridinium chloride

A mixture of 4.0 g. of 4-(3-methyl-1,2,4-oxadiazol-5-yl)pyridine and 10 ml. of methyl chloride is heated in a bomb at 90° C. for 20 hours. The excess methyl chloride is evaporated and the solid residue is recrystallized from isopropyl alcohol-hexane to give cream colored crystals, melting point 173–175° C.

EXAMPLE 24

Preparation of 1-methyl-4-(3-cyclopropyl-1,2,4-oxadiazol-5-yl)pyridinium chloride A mixture of 4.0 g. of 4-(3-cyclopropyl-1,2,4-oxadiazol-5-yl)pyridine and 10 ml. of methyl chloride is heated in a bomb at 90° C. for 20 hours. The excess methyl chloride is evaporated and the residue is recrystallized from acetonitrile to give white crystals, melting point 221–225° C.

EXAMPLE 25

Preparation of 1-methyl-3-(5-methyl-1,2,4-oxadiazol-3-yl)pyridinium iodide

A solution of 8.5 g. of 3-(5-methyl-1,2,4-oxadiazol-3-yl)pyridine and 25 ml. of methyl iodide in 75 ml. of ethanol is heated under reflux for 2 hours. The solution is concentrated under reduced pressure to a solid, which is recrystallized from methanol to provide yellow crystals, melting point 205–206° C., dec.

EXAMPLE 26

Preparation of 1-methyl-2-(5-methyl-1,2,4-oxadiazol-3-yl)pyridinium iodide

A solution of 5.5 g. of 2-(5-methyl-1,2,4-oxadiazol-3-yl)pyridine and 25 ml. of methyl iodide in 75 ml. of ethanol is heated under reflux for 3 hours. The solution is concentrated under reduced pressure to a solid, which is recrystallized from isopropyl alcohol to provide tan crystals, melting point 158–160° C., dec.

EXAMPLE 27

Preparation of tablet compositions containing 1-methyl-4-(1,2,4-oxadiazol-3-yl)pyridinium chloride

| | Per 1000 tablets grams |
|---|---|
| 1 - methyl - 4 - (1,2,4 - oxadiazol-3-yl)pyridinium chloride | 10.0 |
| Corn starch USP | 30.0 |
| Dibasic calcium phosphate | 215.0 |
| Magnesium stearate | 6.0 |

The above ingredients are thoroughly mixed and incorporated into a standard pharmaceutical tablet. Each tablet contains 10 mg. of active component.

EXAMPLE 28

Preparation of hard shell capsules containing 1-methyl-4-(5-methyl-1,2,4-oxadiazol-3-yl)pyridinium chloride

| | Per 1000 capsule grams |
|---|---|
| 1-methyl-4-(5-methyl-1,2,4-oxadiazol - 3 - yl)pyridinium chloride | 20.0 |
| Lactose | 90.0 |
| Magnesium | 1.0 |

The active component, lactose and magnesium stearate are blended together. The mixture is used to fill hard shell capsules of a suitable size each containing 20 mg. of active component.

EXAMPLE 29

Preparation of oral syrup of 1-methyl-4-(5-cyclopropyl-1,2,4-oxadiazol-3-yl)pyridinium chloride

| | Amt. per 100 ml. grams |
|---|---|
| 1-methyl-4-(5-cyclopropyl - 1,2,4 - oxadiazol-3-yl)pyridinium chloride | 0.375 |
| Sodium saccharin NF | 0.010 |
| Sodium citrate USP | 0.250 |
| Methyl paraben USP | 0.072 |
| Propyl paraben USP | 0.018 |
| Cherry flavor | 0.105 |
| FD and C Red #2 | 0.100 |
| Sucrose | 50.00 |
| Purified water, q.s. a.d. 100.00 ml. | |

Dissolve the sucrose and parabens in 40 ml. of purified water at 80° C., cool to 35° C. and add and dissolve the sodium saccharin, sodium citrate, dye and flavor. Add and dissolve the substituted pyridinium chloride. Adjust to final volume with purified water. Each teaspoonful (4 ml.) contains 15 mg. of the active component.

EXAMPLE 30

Preparation of soft gelatin capsules of 1,3-dimethyl-4-(5-methyl-1,2,4-oxadiazol-3-yl)pyridinium iodide One piece soft gelatin capsules for oral use each containing 30 mg. of 1,3-dimethyl-4-(5-methyl-1,2,4-oxadiazol-3-yl)pyridinium iodide are prepared by first dispersing the compound in sufficient corn oil to render the material capsulatable and then encapsulating in the usual manner.

What is claimed is:

1. A method of lowering blood sugar levels in warm-blooded animals which comprises orally administering to said animals a blood sugar lowering amount of a quaternary-1,2,4-oxadiazolyl-pyridinium salt of the formula:

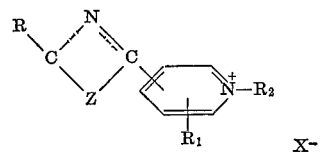

wherein R is selected from the group consisting of hydrogen, lower alkyl, cyclopropyl, cyclobutyl, and phenyl, $R_1$ is selected from the group consisting of hydrogen and lower alkyl; $R_2$ is selected from the group consisting of lower alkyl, lower alkenyl, and lower alkoxy(lower)alkyl; Z is a trivalent radical selected from the group consisting of

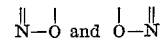

X is a monovalent pharmaceutically acceptable anion; the dotted line represents one double bond, the position being dependent upon the definition of Z, and a nontoxic pharmaceutically acceptable carrier.

2. The method according to claim 1, wherein the quaternary - 1,2,4 - oxadiazolylpyridinium salt is 1 - methyl-4-(1,2,4-oxadiazol-3-yl)pyridinium chloride.

3. The method according to claim 1, wherein the quaternary-1,2,4-oxadiazolylpyridinium salt is 1-methyl-4-(5-methyl-1,2,4-oxadiazol-3-yl)pyridinium chloride.

4. The method according to claim 1, wherein the quaternary-1,2,4-oxadiazolylpyridinium salt is 1-ethyl-4-(5-methyl-1,2,4-ozadiazol-3-yl)pyridinium iodide.

5. The method according to claim 1, wherein the quaternary-1,2,4-oxadiazolylpyridinium salt is 1-allyl-4-(5-methyl-1,2,4-oxadiazol-3-yl)pyridinium chloride.

6. The method according to claim 1, wherein the quaternary-1,2,4-oxadiazolylpyridinium salt is 1-methyl-4-(5-ethyl-1,2,4-oxadiazol-3-yl)pyridinium perchlorate.

7. The method according to claim 1, wherein the quaternary-1,2,4-oxadiazolylpyridinium salt is 1-methyl-4-(5-cyclopropyl-1,2,4-oxadiazol-3-yl)pyridinium chloride.

8. The method according to claim 1, wherein the quaternary-1,2,4-oxadiazolylpyridinium salt is 1,3-dimethyl-4-(5-methyl-1,2,4-oxadiazol-3-yl)pyridinium iodide.

9. An orally administrable composition for lowering blood sugar levels in warm-blooded animals which comprises a non-toxic pharmaceutically acceptable carrier and from 1 mg. to 100 mg. per kilogram of warm-blooded animal body weight of a quaternary-1,2,4-oxadiazolylpyridinium salt of the formula:

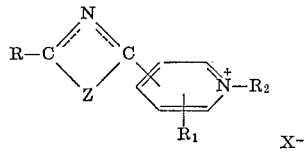

wherein R is selected from the group consisting of hydrogen, lower alkyl, cyclopropyl, cyclobutyl, and phenyl; $R_1$ is selected from the group consisting of hydrogen and lower alkyl; $R_2$ is selected from the group consisting of lower alkyl, lower alkenyl, and lower alkoxy(lower)alkyl; Z is a trivalent radical selected from the group consisting of

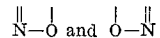

X is a monovalent pharmaceutically acceptable anion and the dotted line represents one double bond, the position being dependent upon the definition of Z.

10. A composition in accordance with claim 9, wherein the quaternary-1,2,4-oxadiazolylpyridinium salt is 1-methyl-4-(5-methyl-1,2,4-oxadiazol-3-yl)pyridinium chloride.

References Cited

FOREIGN PATENTS 875,887   8/1961   Great Britain _____ 260—296

OTHER REFERENCES

Paudler et al.: J. Org. Chem., vol. 32, pp. 2430–2433 (August 1967).

JEROME D. GOLDBERG, Primary Examiner

U.S. Cl. X.R.

260—296